C. Spreckels
Sugar Filtering.
No 3540
Reissued Jul. 6. 1869.
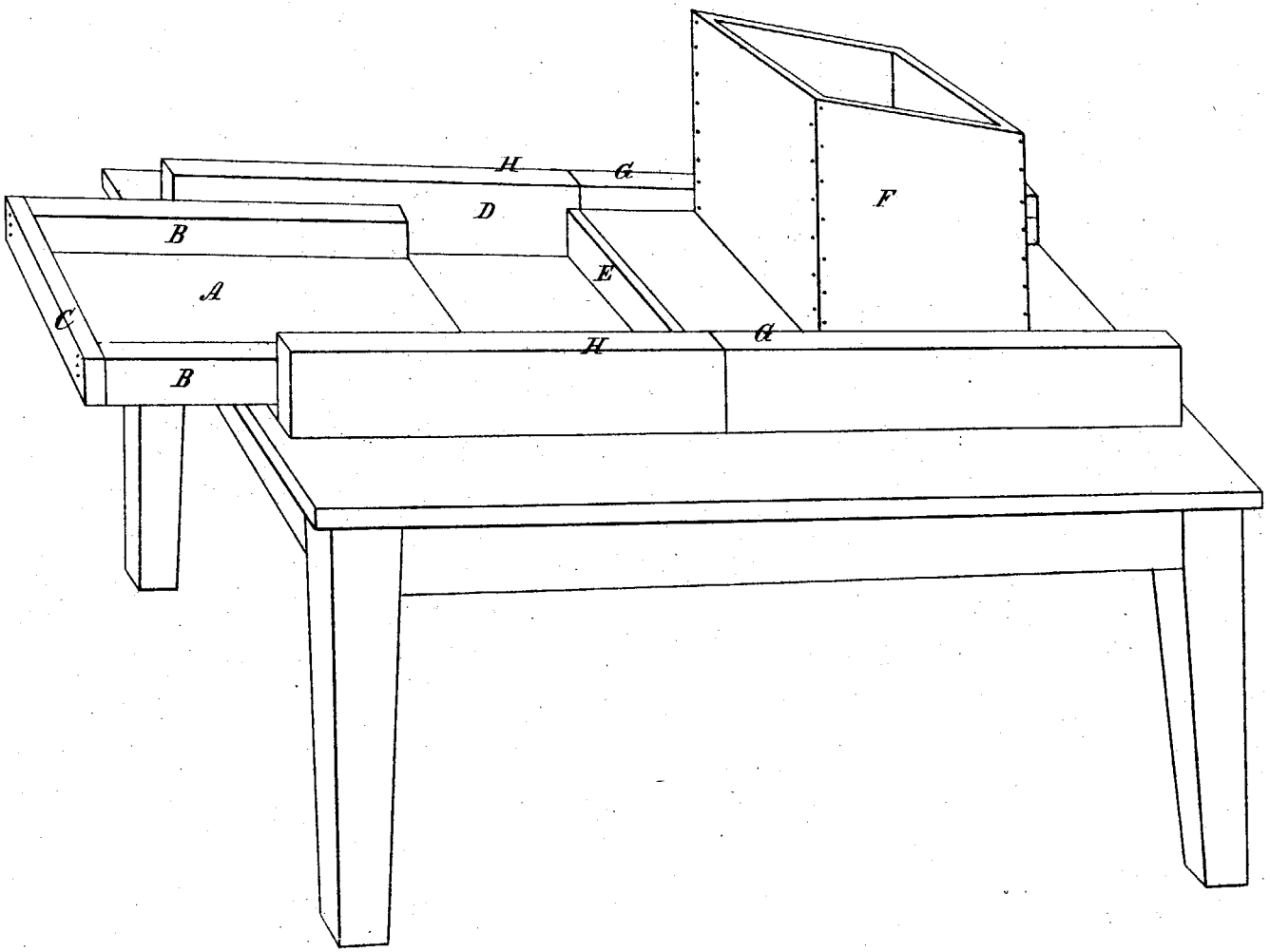
Witnesses.
Alfred Cox
Chas Neuman
Inventor.
Claus Spreckels

UNITED STATES PATENT OFFICE.

CLAUS SPRECKELS, OF SAN FRANCISCO, CALIFORNIA.

IMPROVEMENT IN THE MANUFACTURE OF CRUSHED SUGAR.

Specification forming part of Letters Patent No. 75,656, dated March 17, 1868; Reissue No. 3,540, dated July 6, 1869.

*To all whom it may concern:*

Be it known that I, CLAUS SPRECKELS, of the city and county of San Francisco, State of California, have invented an Improved Process for the Manufacture of Crushed Sugar; and I do hereby declare that the best mode which I have discovered for performing the said process is described in the following specification, with the best apparatus which I have found or devised for performing the same.

The object of my invention or process is to manufacture crushed sugar directly from the centrifugal machine without the tedious delay in the method now employed—to wit, that of turning the melted sugar into molds, and allowing it to refine and drain before it can be crushed into the proper-sized lumps or pieces of commerce, this process requiring from ten to fourteen days, while by my improved process only about three days' time is required, and a sugar furnished of a quality equally as good, and at an expense of at least one cent per pound less.

In order to enable others skilled in the art to which my invention belongs to use and practice it, I will proceed to describe it, together with so much of the apparatus employed therein as is in any respect new or peculiar.

The sugar is taken directly from the centrifugal machine, and, before setting or hardening, is put into molds and pressed.

The molding apparatus is shown in perspective in the accompanying drawings. The mold consists of a shallow box with one end out, the bottom A being of zinc or some other smooth sheet metal, and the two side pieces, B B, and end piece, C, of wood. The inner surfaces of the sides and end incline from the bottom outwardly sufficiently for draft, according to molders' rules. I make my mold about two feet long, ten inches wide, and three and one-half inches deep. This leaves a cake of convenient weight for handling, and of a thickness well suited for easy molding, pressing, drying, and breaking; but different forms and proportions may be used, care being taken not to have the cake so high as to break down. The mold slides in the case D, with its open end against the closed end E of the case, the end E being of the same height as the sides of the mold.

The hopper F (a box without top or bottom) is arranged, as shown in the drawing, to slide from a stationary platform over the mold, guided by the projections G G on the platform and the sides H H of the case. The side pieces of the hopper run on those of the mold, their insides being flush with each other.

The operation and process are as follows: The mold is placed in the case with its open end against the closed end E of the case. In this movement any scattering sugar in the case can be easily scooped into the mold. The hopper, while resting on the platform, is filled with sugar from the centrifugal mill, and run over the mold and back again to its place, by which the mold is evenly filled with sugar. A board cover, about an inch thick and of a size to fit loosely into the mold, is then placed upon the sugar in the mold, and both mold and case passed on a slide or friction-rollers into a press, where pressure is applied upon the cover and sugar beneath to an extent sufficient to make its particles or grains adhere to each other. This will require a pressure of about sixty pounds to the square inch, or about the same as that of a printing-press. Of course the larger the quantity of sugar the greater the pressure required. Care must be taken not to have the pressure so great as to crush the crystals of sugar. As soon as the case returns from the press a workman carefully withdraws the mold from it by the finger-holes with one hand, while with the other hand beneath the mold he raises and balances it, swinging the tail end toward himself till he can slide a hand to each side of the mold, and grasp it with the thumbs on the bottom and his fingers on the cover. The workman then gently turns the mold endwise, upside down, passing the tail end up and over, so as not to spill the sugar from the open end, and rests it upon a bench. This bench is about fifteen inches high and somewhat narrower than the mold, so as not to be in the way of the hands. The workman then withdraws his fingers from the cover to the sides of the mold, and draws the mold off diagonally—that is, upward and backward—leaving the sugar in a cake on the cover. This movement is allowed and its result secured by the inclination of the sides and the open end of the mold. The mold should be kept clean and smooth— that is, it should not be allowed to gum, so as to cause the sugar to adhere to it. It can be cleaned by hot water, a broom, brush, or cloth, according to its state. Sweet oil applied from time to time, and especially after washing, aids very much. The cakes of sugar still on the covers are removed to proper shelves or racks and allowed to set and harden in any convenient temperature. When sufficiently hardened, which will require fiften hours, more or less, according to temperature and ventilation, the cakes are taken from the covers and removed to a drying-room or oven with a temperature of about 130° Fahrenheit, where they remain till sufficiently hardened for crushing, which will be about forty-eight hours.

Having thus described my invention, what I claim as new, and desire to secure by Letters Patent, is—

The process of preparing for crushing sugar taken from the centrifugal machine by molding, pressing, and drying it in the manner substantially as herein described.

CLAUS SPRECKELS.

Witnesses:
ALFRED RIX,
EDW. NUNAN.